United States Patent
Tan et al.

(10) Patent No.: US 7,702,653 B1
(45) Date of Patent: Apr. 20, 2010

(54) METHODS AND SYSTEMS FOR TRIGGERING ACTIONS

(75) Inventors: Chade-Meng Tan, Santa Clara, CA (US); Hunter Everett Walk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 10/880,697

(22) Filed: Jun. 30, 2004

(51) Int. Cl.
G06F 7/00 (2006.01)
G06F 17/00 (2006.01)
G06F 17/30 (2006.01)

(52) U.S. Cl. ........................ 707/104.1; 707/3

(58) Field of Classification Search .......... 707/104.1, 707/3
See application file for complete search history.

(56) References Cited

U.S. PATENT DOCUMENTS

| | | | |
|---|---|---|---|
| 6,256,648 B1 | 7/2001 | Hill | |
| 6,327,590 B1* | 12/2001 | Chidlovskii et al. | 707/5 |
| 6,389,372 B1 | 5/2002 | Glance | |
| 6,594,673 B1 | 7/2003 | Smith | |
| 2002/0023230 A1* | 2/2002 | Bolnick et al. | 713/202 |
| 2002/0116466 A1* | 8/2002 | Trevithick et al. | 709/206 |
| 2002/0124053 A1 | 9/2002 | Adams | |
| 2002/0138331 A1* | 9/2002 | Hosea et al. | 705/10 |
| 2003/0050977 A1 | 3/2003 | Puthenkulam | |
| 2003/0051214 A1* | 3/2003 | Graham et al. | 715/512 |
| 2004/0042599 A1 | 3/2004 | Zaner | |
| 2004/0088325 A1 | 5/2004 | Elder | |
| 2004/0122803 A1 | 6/2004 | Dom | |
| 2004/0172378 A1* | 9/2004 | Shanahan et al. | 707/1 |
| 2005/0171832 A1* | 8/2005 | Hull et al. | 705/10 |
| 2005/0177385 A1* | 8/2005 | Hull et al. | 705/1 |
| 2005/0204276 A1* | 9/2005 | Hosea et al. | 715/501.1 |
| 2005/0209999 A1* | 9/2005 | Jou | 707/2 |

FOREIGN PATENT DOCUMENTS

| | | |
|---|---|---|
| JP | 11265369 A | 9/1999 |
| JP | 2002132604 A | 10/2002 |
| WO | WO 00/68860 | 11/2000 |

OTHER PUBLICATIONS

Adamic. Lada et al., Web Site, "A Social Network Caught in the Web." http://firstmonday.org/issues/issue8_6/adamic/, printed Jul. 28, 2004.

Web Site, "About Multiply," http://multiply.com/info/about, printed May 3. 2004.

(Continued)

*Primary Examiner*—Apu M Mofiz
*Assistant Examiner*—Jared M Bibbee
(74) *Attorney, Agent, or Firm*—Fenwick & West LLP

(57) ABSTRACT

Systems and methods for triggering actions are set forth. According to one embodiment, a method comprising determining at least one triggering condition associated with an article, correlating the triggering condition with information associated with a user, and providing the user with a notification relating to the triggering condition is described.

33 Claims, 3 Drawing Sheets

OTHER PUBLICATIONS

Web Site, "Help," http://multiply.com/info/help. printed May 3. 2004.

Web Site, "Is Friendster the 'Next Big Thing'"? http://mobilemomentum.msn.com/article.aspx7aid=4, printed Mar. 25, 2004.

Web Site, "Multiply Privacy Policy." http://multiply.com/info/privacy. printed May 3, 2004.

Web Site. "Multiply Terms of Service." http://multiply.com/info/los, printed May 3, 2004.

Web Site, "Running Notes From Revenge of the User Lessons from Creator/User Battles." http://craphound.com/danahetcon04.txt, printed Jul. 28, 2004.

Web Site, "WestClip". printed Jul. 28, 2004.

Rick Munarriz. LifeMinders.com Markets a Double. Mar. 9, 2000.

* cited by examiner

METHODS AND SYSTEMS FOR TRIGGERING ACTIONS

FIELD OF THE INVENTION

The invention generally relates to network articles. More particularly, the invention relates to systems and methods for triggering actions.

BACKGROUND

The Internet contains vast amounts of information. Often there is information in web pages or other Internet articles that would be of use to a user, but that the user is not aware of. In many situations, the user is not even aware that the information would be useful. For example, a local school website can list a registration deadline. A user with children in the school district may not be aware of the deadline and may further be unaware that he needs to seek out the deadline. Conventional methods and systems do not provide adequate means for apprising a user of information that would be useful to the user, but that the user has not actively sought out.

SUMMARY

According to one embodiment, a method comprises determining at least one triggering condition associated with an article, correlating the triggering condition with information associated with a user, and providing the user with a notification relating to the triggering condition.

This exemplary embodiment is mentioned not to limit or define the invention, but to provide one example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Overview

The present invention comprises methods and systems for triggering actions. For example, one embodiment provides a method for presenting useful information to a user based on triggering conditions associated with an article and profile information associated with the user. The triggering conditions can include instructions that indicate circumstances under which the article will be useful to a user. The circumstances can be identified by profile information for the user which can contain, among other things, contact information, personal information, professional information, or other information describing the user.

System Architecture

Figure 1:
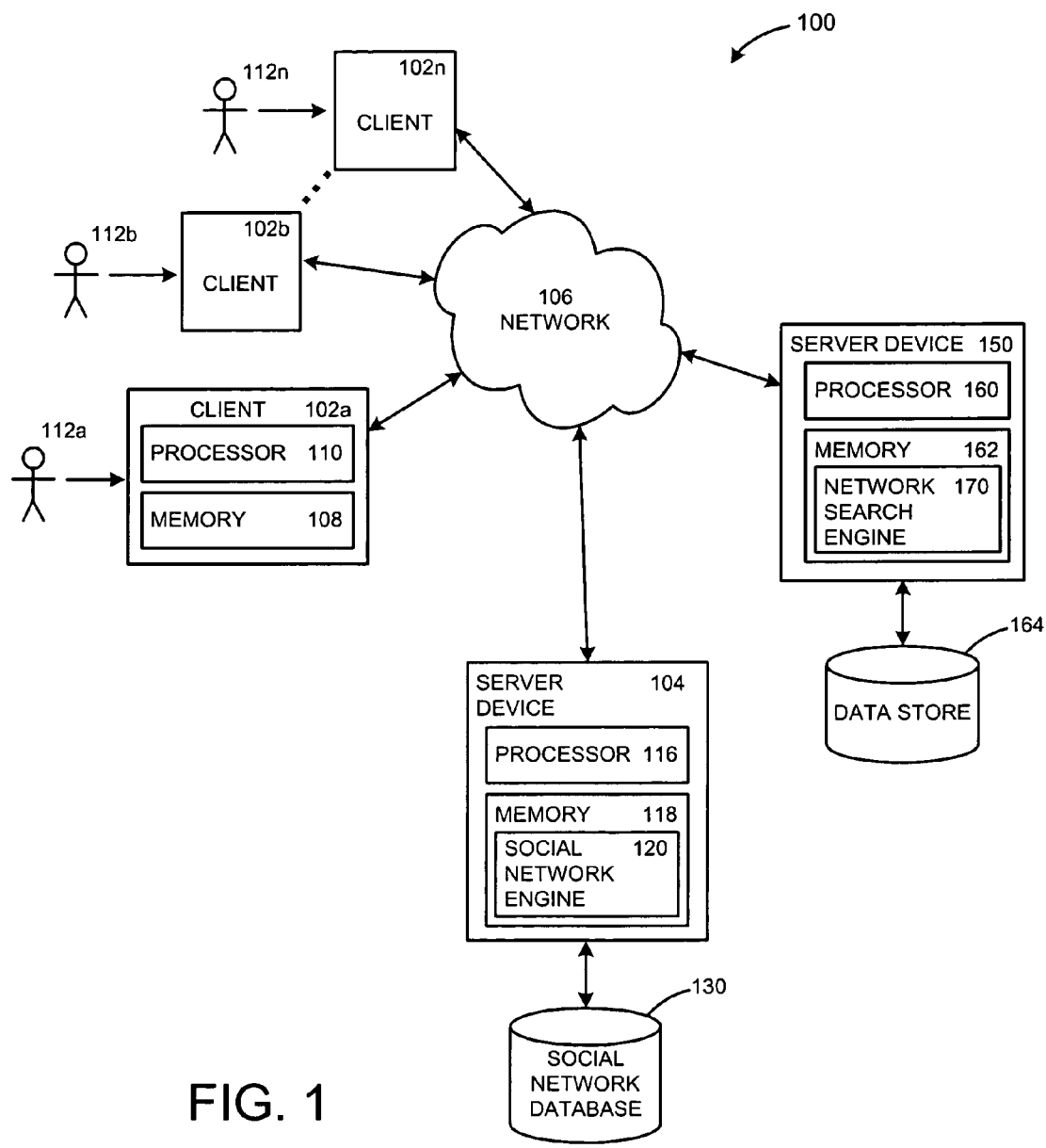
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 comprises the Internet. In other embodiments, other networks, such as an intranet, WAN, or LAN may be used. According to another embodiment, the network 106 can comprise servers attached to the network 106. Moreover, methods according to the present invention may operate within a single computer.

The client devices 102a-n shown in FIG. 1 each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n can include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 allows users, such as user 112a, to interact with and participate in a social network. A social network can refer to a computer network connecting people or organizations by a set of social relationships, such as friendship, co-working, or information exchange. A social network can comprise profiles that can be associated with other profiles. Each profile may represent a member, and a member can be an entity such as, for example, a person, an organization, a business, a corporation, a community, a fictitious person, or other suitable entity. Each profile can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

Additionally, entries within a profile can comprise associations with other profiles. Associations between profiles within a social network can include, for example, friendships, business relationships, acquaintances, community associations, activity partner associations, common interest associations, common characteristic associations, or any other suitable type of social relationship connection. Associations between profiles can also have various levels. For example, friendship levels can include, for example, a "haven't met" level, an "acquaintance" level, a "friend" level, a "good friend" level, a "best friend" level, and other suitable levels.

Server device 104 also provides access to storage elements, such as a social network storage element, in the example shown in FIG. 1, a social network database 130. The social network database 130 can be used to store profiles, or other social network components. Data storage elements may facilitate any one or combination of methods for storing data, including without limitation, arrays, hash tables, lists, and pairs. Other similar types of data storage devices can be accessed by the server device 104. The social network engine 120 can receive data comprising the profiles and communities from the social network database 130 and can also send data comprising communities and profiles to the social network database 130 for storage. The social network database 130 may be physically attached or otherwise in communication with the social network engine 120 by way of a network or other connection. Through the client devices 102a-n, users 112a-n can communicate over the network 106, with each other and with other systems and devices coupled to the network 106. As shown in FIG. 1, a server device 150 can be coupled to the network 106. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains a search engine application program, also known as a search engine 170. The search engine 170 can locate relevant information from the network 106, for example from a server attached to the network 106, and from the server 104 in response to a search query from a client device 102a. Relevant information from the network 106 can include articles relevant to a search query. Articles can include, for example, word processor documents, spreadsheet documents, presentation documents, emails, instant messenger messages, database entries, calendar entries, appointment entries, task manager entries, and other client application program content files, messages, items, web pages of various formats, such as HTML, XML, XHTML, Portable Document Format (PDF) files, image files, audio files, and video files, or any other documents or items or groups of documents or items or information of any type whatsoever. Relevant information from the server 104 can include profile information for a member of a social network.

The network search engine 170 can also identify triggering conditions associated with articles and identify profile information for users. The network search engine 170 can further identify matches between triggering conditions and user profiles. Triggering conditions can comprise, for example, instructions contained in program code associated with an article that can identify under which circumstances the article will be useful to a user or when an action is to be performed. According to one embodiment, the program code can comprise, for example, a markup language such as XML or SGML or other suitable markup language. The circumstances under which an action is to be performed can comprise, for example, attributes or profile entries for a user. For example, a school web page can contain a triggering condition indicating that all users within the school's district should receive a notification of registration deadlines. Triggering conditions can comprise program code, such as, for example, XML program code on an XML host, program code on a separate server from a server hosting an associated article or program code within the meta-text of an article. For example, a host server can host a web page and the server device 150 can maintain triggering conditions associated with the web page. Triggering conditions can indicate actions to be performed when the triggering conditions are satisfied. Actions can include, for example, sending an email, displaying a link to an article, such as, for example, a web page containing the triggering condition, adding a user to a mailing list, or other suitable actions. The network search engine 170 can identify information within a profile and determine whether the information satisfies a triggering condition. For example, the network search engine 170 can identify users with addresses within a school district and notify the users of the school's web page, for example, so that they can be aware of the registration deadline.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the methods illustrated in FIGS. 2 and 3.

Exemplary Social Network

Figure 2:
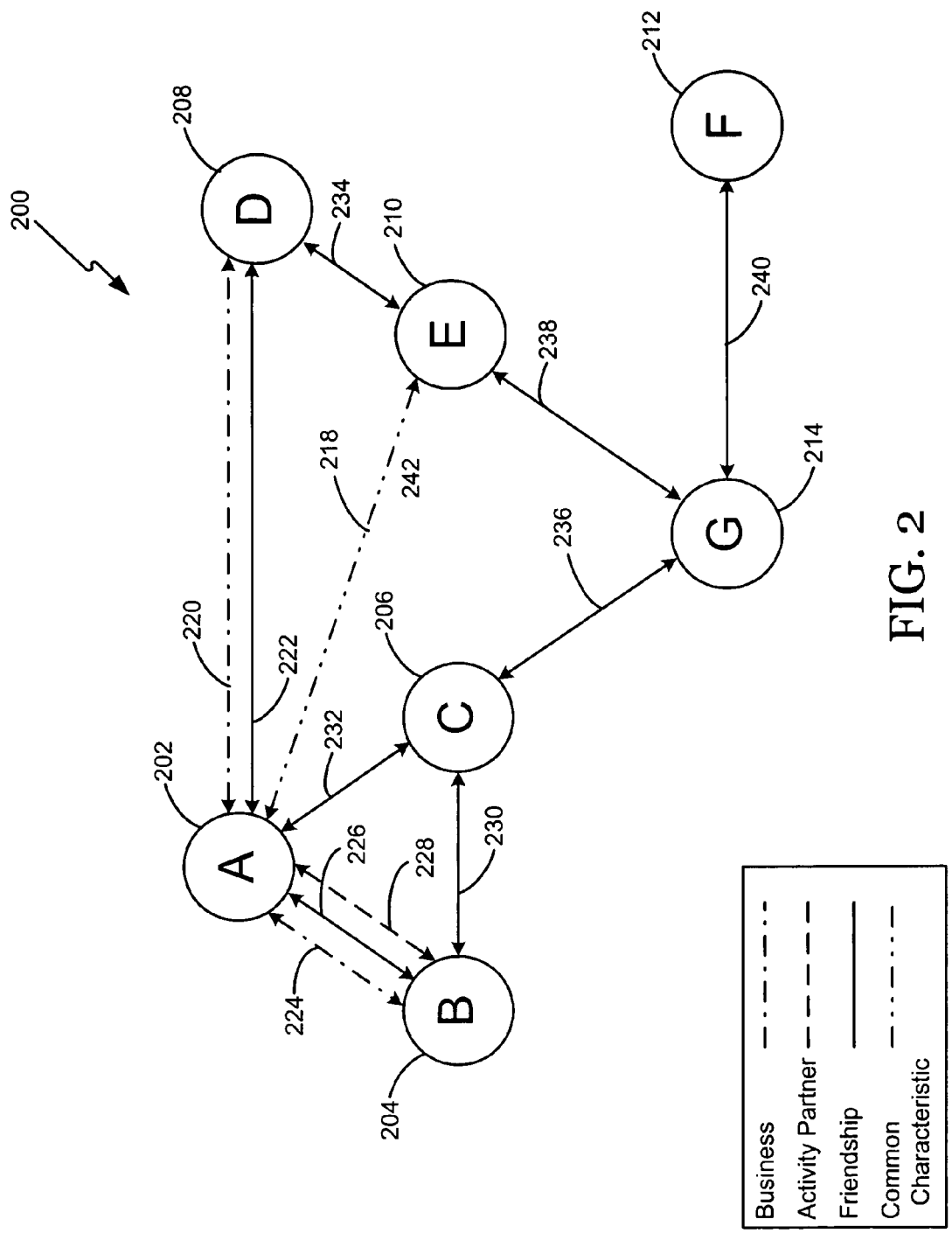
FIG. 2 illustrates a diagram of an exemplary social network in accordance with one embodiment of the present invention.

FIG. 2 shows a diagram of a social network 200 according to one embodiment, of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 comprise profiles A, B, C, D, E, F, and G, respectively. Each profile can represent a member profile of a member of the social network 200. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, 234, 236, 238, and 240 shown comprise associations between profiles. According to the embodiment shown in FIG. 2, the social network 200 comprises a plurality of differing types of associations represented by edges 218, 220, 222, 224, 226, 228, 230, 232, 234, 236, 238, and 240. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, 234, 236, 238, and 240 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Processes

Various methods in accordance with the present invention can be carried out. One exemplary method comprises determining a triggering condition associated with an article, correlating the triggering condition with information associated with a user, and providing the user with a notification relating to the triggering condition. In one embodiment, the article is provided to the user.

Determining a triggering condition associated with the article may be accomplished in any suitable manner. For example, the article may be examined to determine the presence of data that may be used to trigger an action. Examples of such data may include a geographical location, occupational information, interest or activity information, and personal information. For example, a triggering condition may comprise the presence of the term "San Diego" more than four times in a web page.

The triggering condition may be correlated with information associated with the user in any suitable manner. For example, the triggering information may be compared to the information associated with a member of a social network, associated with the information, or otherwise correlated with the triggering condition. For example, if the triggering condition is based on the term "San Diego" appearing in the article, the triggering condition can be correlated with an address of a member of the social network located in San Diego. In one embodiment, such correlating comprises determining whether there is a match between the triggering condition and the information associated with the member, and providing the notification if there is a match. For example, a link to an article containing information associated with the member of the social network can be emailed to the member. According to another embodiment, the information may be profile information for a member of a social network or can comprise information about a member including, for example, IP address information, preference information, or bookmark information.

Another exemplary method comprises determining at least one triggering condition associated with an article, determining at least one action associated with the triggering condition, determining profile information for a user, determining a match between the triggering condition and the profile information, and performing the action based at least in part on the match. According to another embodiment, the triggering condition can be determined at least in part by crawling a network. According to another embodiment, the triggering condition can be determined at least in part by parsing article content. According to another embodiment, determining the triggering condition can comprise receiving input. According to one embodiment, receiving input can comprise presenting a publisher with a user interface. According to another embodiment, the triggering condition can be contained in meta text of an article. According to another embodiment, the triggering condition can be contained on a separate XML host. According to another embodiment, the triggering condition can be contained on a server separate from a second server hosting the article.

According to one embodiment, the triggering condition can comprise one or more of a geographical location associated with a user, occupational information associated with a user, interest or activity information associated with a user, or personal information associated with a user. According to another embodiment, the action can comprise one or more of sending an email, sending a link to an article, or sending executable program code. According to another embodiment, the profile information for a user can be associated with a network of associated users. According to another embodiment, the network of associated users can be a social network. According to another embodiment, determining a match can comprise concept matching. According to another embodiment, determining a match can comprise multi-level matching. According to another embodiment, determining a match can comprise providing false profile information.

Figure 3:
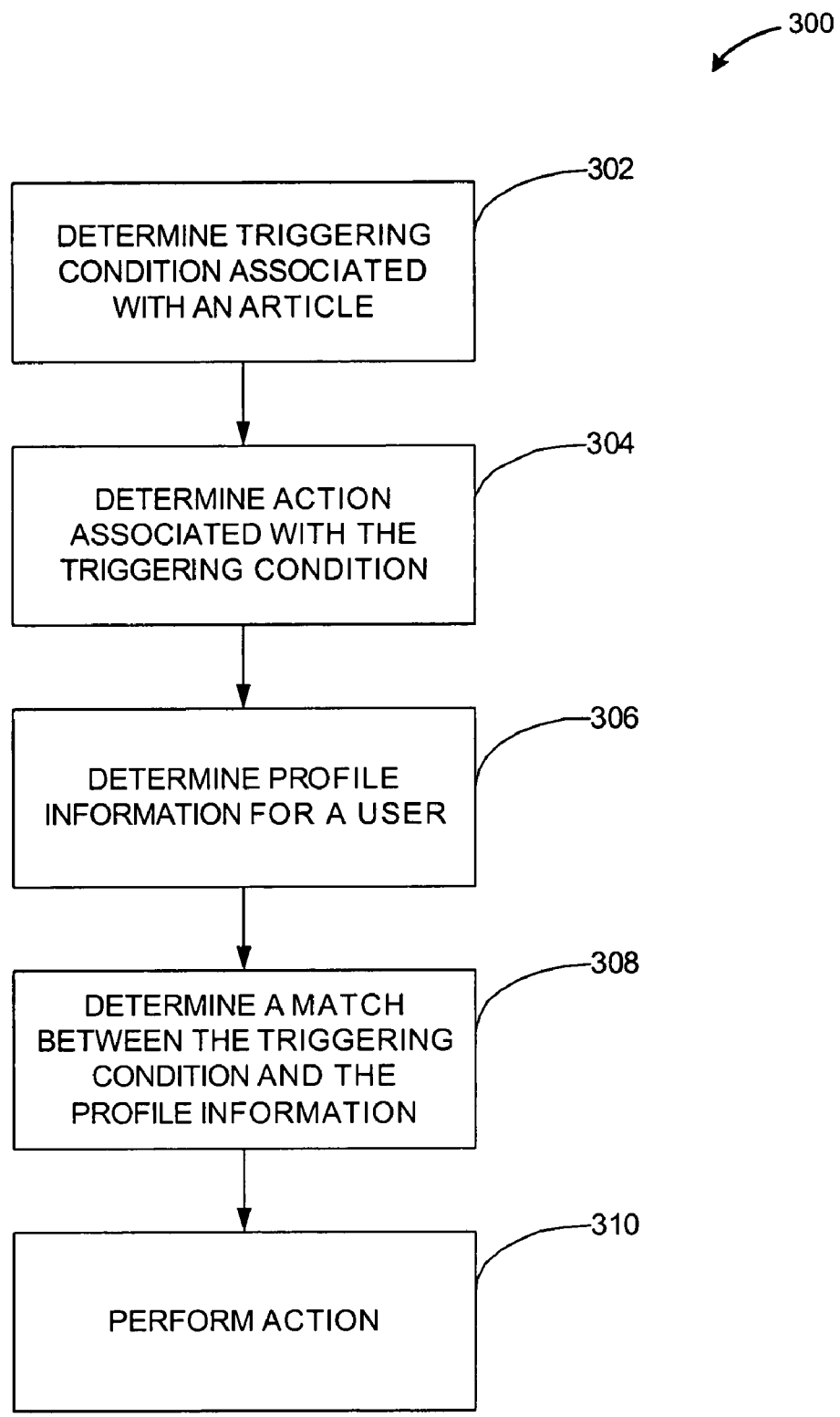
FIG. 3 illustrates a method in accordance with one embodiment of the present invention.

FIG. 3 illustrates an exemplary method 300 in accordance with the present invention in detail. This exemplary method is provided by way of example, as it will be appreciated from the foregoing description of exemplary embodiments there are a variety of ways to carry out methods in other embodiments of the present invention. The method 300 shown in FIG. 3 can be executed or otherwise performed by any of various systems. The method 300 is described below as carried out by the system 100 shown in FIG. 1 by way of example, and various elements of the system 100 are referenced in explaining the example method of FIG. 3. The method 300 shown provides a method for selecting articles containing information useful to a user based on triggering conditions associated with the article and profile information associated with the user.

The method 300 begins in block 302 wherein triggering conditions associated with an article on the network 106 are determined. Determining triggering conditions for articles on the network 106 can comprise, for example, crawling the network 106 to determine triggering conditions indicated by publishers of articles, receiving triggering conditions from publishers or other users, or parsing articles located on the network 106. Crawling the network 106 to determine triggering conditions can comprise, for example, sequentially accessing articles on the network 106, determining the content of each article, and analyzing the article's content to determine whether the content contains triggering conditions. For example, the network search engine 170 can sequentially access web pages on the network 106 and determine triggering conditions included in the meta-text associated with the web pages or triggering conditions contained on a separate XML server associated with the article, for example. The triggering conditions can be identified, for example, by identifying tags within program code associated with an article. For example, a triggering condition tag can have a name "triggering_condition," or other suitable name, that identifies that one or more elements associated with the tag include triggering conditions.

Receiving triggering conditions from publishers or other users can comprise, for example, presenting publishers with a user interface, recording selections indicated by the publishers or other users, and converting the selections to a suitable program code such as XML, for example. For example, a form can be presented to a publisher publishing a web page that prompts the publisher for conditions under which certain content of the web page will be useful to a user. The web page can be a school's home page, for example, and can contain registration deadlines for members of the school's district. The publisher of the web page can indicate a condition under which users will benefit from the registration deadlines. For example, the publisher can indicate that if a user lives within the school's district and if the user has school age children, then the user should be made aware of the registration deadlines. The network search engine 170 can receive this information from the publisher and thereby determine a triggering condition of users living within the school's district and having school age children. According to one embodiment, the network search engine 170 can then convert this information to program code such as XML and store the program code in association with the article. For example, the triggering condition can be converted to XML code and stored on a separate XML server with a reference connecting it to the original article.

Parsing articles located on the network 106 can comprise, for example, splitting up words, images, and other content associated with the article and analyzing the words, images, and other content to determine conditions under which the information contained in the article may be relevant to a user. For example, a web page can contain a news story indicating that foreign governments have passed laws impacting their citizens visiting in the United States. The network search engine 170 can parse the content of the news story to determine that the information relates, for example, to non-U.S. citizens and concerns emigration law. The network search engine 170 can then use this information to create a triggering condition comprising, for example, "citizenship=non-U.S." and "current_location=U.S." This triggering condition can then be used to send information regarding the new laws to users who's profile information satisfies the conditions, i.e. is a non-U.S. citizen and is currently located in the U.S.

Once triggering conditions have been determined, the method 300 proceeds to block 304, wherein an action associated with the triggering condition is determined. The action associated with the triggering condition can comprise, for example, sending an email, presenting a link to an article, displaying an article to a user, or a custom action. The action can be indicated in the same program code indicating the triggering condition, for example, the meta-text or XML code, or can be based, for example, on a default action or custom action determined by the network engine 170. For example, the network search engine 170 can determine a triggering condition within the meta-text of the school web page in the previous example and can determine that the meta-text also comprises instructions for an action associated with the triggering condition including, for example, sending an email to users within the school district to notify them of the registration dates. The network search engine 170 can also determine the action in response to input from a publisher, for example, indicating what action should be associated with a triggering condition. For example, the network search engine 170 can receive input from a user indicating that users within the school district with school age children should receive an email within two weeks of the registration deadline. The network search engine 170 can also use a default action in response to a triggering condition. For example, the network search engine 170 can send an email with a link to an article as a default action if not other action is determined for a triggering condition. For example, a publisher can indicate a triggering condition associated with a web page without specifying an action associated with the triggering condition. The network search engine 170 can determine that the triggering conditions associated with the web page are satisfied for the user 112a and, based on a default action of sending an email, can cause an email to be sent to the user 112a indicating the triggering condition that prompted the email and containing a link to the article associated with the triggering condition.

The network search engine 170 can also determine a custom action associated with a triggering condition. A custom action can comprise, for example, sending executable program code, such as an applet or other suitable application, to the user 112a in response to the triggering condition. For example, in the case of the school registration example, the user 112a can be sent an applet that will facilitate registering the user's 112a children for school.

Once an action associated with the triggering condition is determined, the method 300 proceeds to block 306, wherein profile information is determined. Profile information can be determined, for example, by receiving profile information from a database within a network of associated profiles, such as a social network, by extracting profile information, by receiving information from an application on a client device, by receiving manual input from the user 112a, or by another suitable method. For example, the network search engine 170 can receive from the social network database 130 profiles of members of the social network on the server device 104. Members of the social network can indicate, for example, which profile information they are willing to share for purpose of determining triggering conditions. For example, a member of the social network can indicate that he is willing to share an address or hobby interest but is not willing to share the name and age of his children. The network search engine 170, in this example, can receive the information relating to the address and hobby interest and not receive the information relating to the name and age of the children.

Extracting profile information can comprise, for example, determining profile information based on signals from the client device 102a. For example, the network search engine 170 can determine an IP address associated with the client device 102a and can further determine a geographical location for the user 112a based on the IP address associated with the client device 102a. The geographical location for the user 112a can then be used as profile information by the network search engine 170 to determine matching triggering conditions. According to another embodiment, extracting information can include parsing information from an article associated with a user such as a resume or a personal homepage. For example, the user 112a can post a resume on the network 106. The social network engine 120 can locate the resume and determine such profile information as job history, schooling, address information, interests, hobbies, and other suitable information from the resume located on the network 106.

The social network search engine 170 can also receive profile information from an application on the client device 102a. For example, an application on the client device 102a can receive input from the user 112a indicating, for example, the user's 112a address, telephone number, interests, family member information, work information, and other types of profile data. The network search engine 170 can then receive some or all of the profile information from the application on the client device 102a. For example, a profile information application on the client device 102a can contain profile information for the user 112a indicating, for example, an address and the name and age of the user's 112a children. The profile information application on the client device 102a can send only the profile information relating to the user's 112a address and keep the profile information relating to the name and age of the user's 112a children privately on the client device 102a. According to one embodiment, the profile information application on the client device 102a can comprise a toolbar or similar interface adapted to integrate with a plurality of different applications on the client device 102a. For example, the profile information application on the client device 102a can comprise a toolbar that can be presented in association with a menu contained in a web browser application, or a word processing application for example.

Profile information from an application on the client device can also comprise preference information, IP address information, or bookmark information. Preference information can comprise, for example, information indicating language preferences or other preferred settings for the user 112a. IP address information can indicate, for example, a geographical location for the user 112a. Bookmark information can indicate, for example, preferred network articles viewed by the user 112a or interests of the user 112a. For example, articles containing similar data to articles bookmarked by the user 112a can be correlated with the profile information for the user 112a.

Alternatively, the network search engine can receive profile information directly from the user 112a, for example, by presenting the user 112a with a user interface and recording the user's 112a input. The user interface can prompt the user 112a for such information as, for example, contact information, personal information, professional information, or other information describing, identifying, or associated with the user 112a.

Once profile information is determined, the method 300 proceeds to block 308 wherein a match between the triggering condition and the profile information is determined. A match between the triggering condition and the profile information can be determined, for example, by identifying similarities between the profile information and triggering conditions. For example, the triggering condition can comprise the conditions that a user have school age children and live in a certain school district. This information can be matched, for example, with a profile of a user indicating that the user has school age children and lives in the particular district. Identifying matches can comprise, for example, concept matching, matching similar words, identifying duplicate entries, or identifying suitable ranges of values. Concept matching can include, for example, determining a concept or ontology associated with a word or phrase and then identifying other words or phrases related to the concept or ontology. In the example above, the triggering condition "school age children" can be determined to have a meaning of children aged six to eighteen. This can be matched with profile information indicating that a user has a twelve-year-old child. Thus, while the profile information and the triggering condition wordings are not identical, a match can still be determined between the two based on the concept of ontology associated with them. Determining a range of suitable values can comprise determining whether a given value falls within a specified set of values. For example, a triggering condition can include a condition "child's_age>=6 and <=18." The network search engine 170 can then determine that an age of "12" falls within the specified range.

Determining a match between triggering conditions and profile information can be multi-leveled. Multi-leveled matching can comprise determining a first match or plurality of matches by the network search engine 170 and determining a second match or plurality of matches by an profile information application on the client device 102a. Multi-leveled matching can increase security, better manage system resources, provide better matches, and provide other benefits. For example, the user 112a can want to limit the type of profile information sent to the network search engine 170. For example, the user 112a may desire to send address information, but may not want to send information about family members' ages. Multi-level matching can determine a first match or plurality of matches based on the more general profile information of the user's 112a address. This first plurality of matches can include, for example, a notification of school registration, and a notification for homeowners in the area. The network search engine 170 can send all of the notifications which have a triggering condition including the member's address to the client device 102a. A profile information application on the client device 102a can then further narrow the notifications based on more specific profile information for the user 112a. For example, the user 112a can indicate to the profile information application on the client device 102a that the user 112a has school age children and does not own a home. Based on this more specific profile information, the application on the client device can present the user 112a with the notification regarding school registration and not present the user with the notification for homeowners. Multi-leveled matching can also comprise providing false profile information. Providing false profile information can comprise sending erroneous data to the network search engine 170 by the client device 102a. The erroneous data can result in satisfying triggering conditions and receiving additional notifications, for example, which the application on the client device 102a can filter out. Providing false profile information can thus make it more difficult to determine true profile information for the user 112a. For example, the user 112a can have two children and own a home. An application on the client device 102a can send this information along with information indicating that the user 112a has no children and rents an apartment. The conflicting information can make it difficult for a third party to identify which information is correct about the user 112a. The application on the client device 102a can then filter actions prompted by the incorrect profile information, for example, so that only the actions associated with the correct profile information are actually presented to the user 112a.

Once a match between profile information and a triggering condition is determined, the method 300 proceeds to block 310, wherein the action associated with the triggering condition is performed. Performing the action can comprise, for example, sending an email, providing an article or a link to an article to a user, or other custom action associated with the triggering condition. For example, in the school registration example above, the action can comprise sending an email to the user 112a notifying the user of the satisfied triggering conditions prompting the email and including a link to the school's web page along with a brief explanation of the registration requirement. Alternatively, the network search engine 170 can present the user with a partially completed registration form, for example. The registration form can be partially completed, for example, with the profile information satisfying the triggering conditions. Thus, in the previous example, the form could be partially completed with the name and age of the user's 112a children and an address. According to other embodiments, an applet or executable program can be sent in response to a triggering condition. The applet can perform any suitable action based on the profile information, triggering conditions, or other conditions or information determined by the network search engine 170.

GENERAL

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A computer-implemented method performed by one or more computer systems, the method comprising:
    storing for each of a plurality of users, a user profile comprised of user supplied information associated with the user in a database associated with a social network;

automatically determining a plurality of web pages that are independent of the social network;

responsive to automatically determining the plurality of web pages, identifying via a communications network one or more triggering conditions associated with a web page from the plurality of web pages, wherein each triggering condition is based on a descriptive attribute of content included in the web page and each triggering condition specifies an action to be performed subsequent to the triggering condition being satisfied;

automatically determining a select user profile in response to the user supplied information for the select user profile satisfying at least one triggering condition associated with the web page; and responsive to the at least one triggering condition associated with the web page being satisfied by the descriptive attribute included in the select user profile, performing the action specified by the triggering condition.

2. The method of claim 1, further comprising providing the user with the web page.

3. The method of claim 1, wherein the user supplied information comprises one or more of a geographical location, occupational information, interest or activity information, and personal information.

4. The method of claim 1, wherein the user comprises a member of a social network.

5. The method of claim 4, wherein the user profile comprises the user profile for the member of the social network.

6. The method of claim 1, wherein the user supplied information comprises one or more of IP address information, bookmark information, and personal preference information.

7. A computer-readable storage medium containing program code which is executable by one or more computer systems, the program code comprising:

program code for storing for each of a plurality of users, a user profile comprised of user supplied information associated with the user in a database associated with a social network;

program code for automatically determining a plurality of web pages that are independent of the social network;

program code for responsive to automatically determining the plurality of web pages, identifying via a communications network one or more triggering conditions associated with a web page from the plurality of web pages, wherein each triggering condition is based on a descriptive attribute of content included in the web page and each triggering condition specifies an action to be performed subsequent to the triggering condition being satisfied;

program code for automatically determining a user profile in response to the user supplied information for the select user profile satisfying at least one triggering condition associated with the web page;

program code for responsive to the at least one triggering condition associated with the web page being satisfied by the descriptive attribute included in the select user profile, performing the action specified by the triggering condition.

8. The computer-readable medium of claim 7, further comprising program code for providing the user with the web page.

9. The computer-readable medium of claim 7, wherein the the user supplied information comprises one or more of a geographical location, occupational information, interest or activity information, and personal information.

10. The computer-readable medium of claim 7, wherein the user comprises a member of a social network.

11. The computer-readable medium of claim 10, wherein the user profile comprises the user profile for the member of the social network.

12. The computer-readable medium of claim 1, wherein the the user supplied information comprises one or more of IP address information, bookmark information, and personal preference information.

13. The method of claim 1, wherein the action comprises one or more of sending an email, sending a link to the web page, adding the user to a mailing list and sending executable program code.

14. The computer-readable medium of claim 7, wherein the action comprises one or more of sending an email, sending a link to the web page, adding the user to a mailing list and sending executable program code.

15. The method of claim 1, wherein identifying via a communications network one or more triggering conditions associated with the web page is based on text analysis of web page content.

16. The method of claim 1, wherein identifying via a communications network one or more triggering conditions associated with the web page further comprises identifying the triggering condition in program code in the website containing the web page.

17. The method of claim 1, wherein identifying via a communications network one or more triggering conditions associated with the web page further comprises identifying the triggering condition in markup language in the website containing the web page.

18. The method of claim 1, wherein identifying via a communications network one or more triggering conditions associated with the web page further comprises identifying the triggering condition in meta-text in the website containing the web page.

19. The method of claim 1, wherein identifying via a communications network one or more triggering conditions associated with the web page further comprises receiving input from a publisher.

20. The method of claim 19, wherein receiving input from the publisher comprises presenting the publisher with a user-interface.

21. The computer readable medium of claim 7, wherein identifying via a communications network one or more triggering conditions associated with the web page is based on text analysis of web page content.

22. The computer readable medium of claim 7, wherein identifying via a communications network one or more triggering conditions associated with the web page further comprises identifying the triggering condition in program code in the website containing the web page.

23. The computer readable medium of claim 7, wherein identifying via a communications network one or more triggering conditions associated with the web page further comprises identifying the triggering condition in markup language in the website containing the web page.

24. The computer readable medium of claim 7, wherein identifying via a communications network one or more triggering conditions associated with the web page further comprises identifying the triggering condition in meta-text in the website containing the web page.

25. The computer readable medium of claim 7, wherein identifying via a communications network one or more triggering conditions associated with the web page further comprises receiving input from a publisher.

26. The computer readable medium of claim 25, wherein receiving input from the publisher comprises presenting the publisher with a user-interface.

27. A computer system, comprising:

a computer-readable memory;

a processor;

a user profile database that is associated with a social network, the user profile database adapted to store for each of a plurality of users, a user profile comprised of user supplied information associated with the user, wherein the user profile database is stored in the computer readable memory;

a web site determination module for automatically determining a plurality of web pages that are independent of the social network;

a trigger mining module adapted to identify via a communications network one or more triggering conditions associated with a web page from the plurality of web pages responsive to automatically determining the plurality of web pages, wherein each triggering condition is based on a descriptive attribute of content included in the web page and each triggering condition specifies an action to be performed subsequent to the triggering condition being satisfied, wherein the trigger mining module is stored on the computer-readable memory and executable by the processor;

a profile mining module adapted to automatically determine a user profile from the user profile database in response to the user supplied information for the select user profile satisfying at least one triggering condition associated with the web page, wherein the profile mining module is stored on the computer-readable memory and executable by the processor;

a trigger matching module adapted to perform the action specified by the triggering condition responsive to the at least one triggering condition associated with the web page being satisfied by the descriptive attribute included in the select user profile, wherein the trigger matching module is stored on the computer-readable memory and executable by the processor.

28. The system of claim 27, wherein the trigger mining module is further adapted to identify the triggering condition in one of:

program code in the website containing the web page;

markup language in the website containing the web page;

meta-text in the website containing the web page; and input received by presenting a publisher of a website with a user-interface.

29. The method of claim 1, wherein the article is executable program code and the message comprises the executable program code.

30. The method of claim 1, wherein the article is the web page and the message comprises a link to the web page.

31. The method of claim 1, wherein the article is a notification and the message comprises the notification.

32. The method of claim 1, wherein the action comprises one or more of sending an email, sending a link to the web page, adding the user to a mailing list and sending executable program code.

33. The computer-readable medium of claim 7, wherein the action comprises one or more of sending an email, sending a link to the web page, adding the user to a mailing list and sending executable program code.

* * * * *

UNITED STATES PATENT AND TRADEMARK OFFICE
CERTIFICATE OF CORRECTION

PATENT NO. : 7,702,653 B1  
APPLICATION NO. : 10/880697  
DATED : April 20, 2010  
INVENTOR(S) : Chade-Meng Tan and Hunter Everett Walk Page 1 of 1

It is certified that error appears in the above-identified patent and that said Letters Patent is hereby corrected as shown below:

Column 15, line 63, before "user," delete "the".

Column 16, line 5, before "user," delete "the".

Signed and Sealed this

Twenty-ninth Day of June, 2010

David J. Kappos  
*Director of the United States Patent and Trademark Office*